United States Patent
Zhang et al.

(10) Patent No.: US 11,331,584 B2
(45) Date of Patent: May 17, 2022

(54) INFORMATION DISPLAY METHOD AND APPARATUS FOR VIRTUAL PET, TERMINAL, SERVER, STORAGE MEDIUM, AND SYSTEM

(71) Applicant: TENCENT TECHNOLOGY (SHENZHEN) COMPANY LIMITED, Guangdong (CN)

(72) Inventors: Yi Cheng Zhang, Shenzhen (CN); Wei Peng, Shenzhen (CN); Xing He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/014,377

(22) Filed: Sep. 8, 2020

(65) Prior Publication Data

US 2020/0398167 A1 Dec. 24, 2020

Related U.S. Application Data

(63) Continuation of application No. PCT/CN2019/102117, filed on Aug. 23, 2019.

(30) Foreign Application Priority Data

Sep. 30, 2018 (CN) .......................... 201811005117.3

(51) Int. Cl.
*A63F 13/825* (2014.01)
*A63F 13/58* (2014.01)
(Continued)

(52) U.S. Cl.
CPC ............ *A63F 13/825* (2014.09); *A63F 13/58* (2014.09); *G06N 3/126* (2013.01); *G06T 13/40* (2013.01);
(Continued)

(58) Field of Classification Search
CPC .................... A63F 13/58; A63F 13/825; A63F 2300/8058; G06T 13/40; G06N 3/126
See application file for complete search history.

(56) References Cited

U.S. PATENT DOCUMENTS

| 6,253,167 B1 * | 6/2001 | Matsuda | ................ G06N 3/006 |
| | | | 345/419 |
| 2005/0119896 A1 * | 6/2005 | Bennett | ................... G10L 15/18 |
| | | | 704/270.1 |

(Continued)

FOREIGN PATENT DOCUMENTS

| CN | 101179567 A | 5/2008 |
| CN | 108123839 A | 6/2018 |

(Continued)

OTHER PUBLICATIONS

International Search Report for PCT/CN2019/102117 dated Nov. 21, 2019 [PCT/ISA/210].

(Continued)

*Primary Examiner* — James S. McClellan
(74) *Attorney, Agent, or Firm* — Sughrue Mion, PLLC

(57) ABSTRACT

An information display apparatus and method for displaying a virtual pet are provided. The method includes obtaining an event display instruction corresponding to the virtual pet from a user; obtaining, by a terminal from a server, event journal information of the virtual pet according to the event display instruction, the event journal information including information about n events related to the virtual pet, where n is a positive integer; and displaying the event journal information.

15 Claims, 8 Drawing Sheets

(51) Int. Cl.
*G06N 3/12* (2006.01)
*G06T 13/40* (2011.01)
(52) U.S. Cl.
CPC . *A63F 2300/308* (2013.01); *A63F 2300/8058* (2013.01)

(56) References Cited

U.S. PATENT DOCUMENTS

| | | |
|---|---|---|
| 2009/0248881 A1 | 10/2009 | Guo et al. |
| 2011/0070935 A1* | 3/2011 | Beggs ................ A63F 13/825 463/1 |
| 2019/0118094 A1* | 4/2019 | McCoy ................ H04L 9/3239 |

FOREIGN PATENT DOCUMENTS

| | | |
|---|---|---|
| CN | 109032454 A | 12/2018 |
| JP | 2000-24315 A | 1/2000 |
| WO | 2008/108490 A1 | 9/2008 |

OTHER PUBLICATIONS

Written Opinion Report for PCT/CN2019/102117 dated Nov. 21, 2019 [PCT/ISA/237].
Korean Office Action for 201811005173 dated Aug. 30, 2018.
Communication dated Feb. 7, 2022 from the Japanese Patent Office in Japanese Application No. 2020-568416.
Cryptoninja, 2018, Retrieved from: URL: <https://www.atpress.ne.jp/news/157008> (4 pages total).

* cited by examiner

INFORMATION DISPLAY METHOD AND APPARATUS FOR VIRTUAL PET, TERMINAL, SERVER, STORAGE MEDIUM, AND SYSTEM

CROSS-REFERENCE TO RELATED APPLICATION(S)

This application is a continuation of PCT/CN2019/102117, filed on Aug. 23, 2019, and claims priority to Chinese Patent Application No. 201811005117.3, entitled "INFORMATION DISPLAY METHOD AND APPARATUS FOR VIRTUAL PET, TERMINAL, SERVER, STORAGE MEDIUM, AND SYSTEM" filed with the China National Intellectual Property Administration on Aug. 30, 2018, the disclosures of which are incorporated by reference herein in their entireties.

BACKGROUND

1. Field

Embodiments of the disclosure relate to the field of Internet technologies, and in particular, to an information display method, apparatus, storage medium and device for a virtual pet.

2. Description of Related Art

Some game application programs are provided with virtual pets, and the virtual pets can be various animal images or cartoon images.

When a player triggers a detail interface displaying a virtual pet in a game application program, the game application program will display the detail interface of the virtual pet. For example, the detail interface may include name, level, health point, attack power, defense power and other information about the virtual pet.

At present, information content displayed in a detail interface of a virtual pet is limited.

SUMMARY

According to an embodiment, there is provided an information display method for displaying a virtual pet, performed by a terminal on which an application program runs, the application program providing at least one image of the virtual pet, the method including: obtaining, by the terminal, an event display instruction corresponding to the virtual pet from a user; obtaining, by the terminal from a server, event journal information of the virtual pet according to the event display instruction, the event journal information including information about n events related to the virtual pet, where n is a positive integer; and displaying the event journal information on a display of the terminal.

According to an embodiment, there is provided an information display apparatus for providing at least one image of a virtual pet, including: at least one memory storing computer program code; and at least one processor configured to access the at least one memory and operate as instructed by the computer program code, the computer program code including: instruction obtaining code configured to cause the at least one processor to obtain an event display instruction corresponding to the virtual pet from a user; information obtaining code configured to cause the at least one processor to obtain, from a server, event journal information of the virtual pet according to the event display instruction, the event journal information including information about n events related to the target virtual pet, where n is a positive integer; and information display code configured to cause the at least one processor to display the event journal information on a display of the information display apparatus.

According to an embodiment, there is provided a non-transitory computer-readable storage medium storing computer program code to cause at least one computer processor to: obtain an event display instruction corresponding to a virtual pet from a user; obtain, from a server, event journal information of the virtual pet according to the event display instruction, the event journal information including information about n events related to the target virtual pet, where n is a positive integer; and display the event journal information.

DESCRIPTION

Embodiments of the disclosure are described below with reference to the accompanying drawings.

Figure 1:
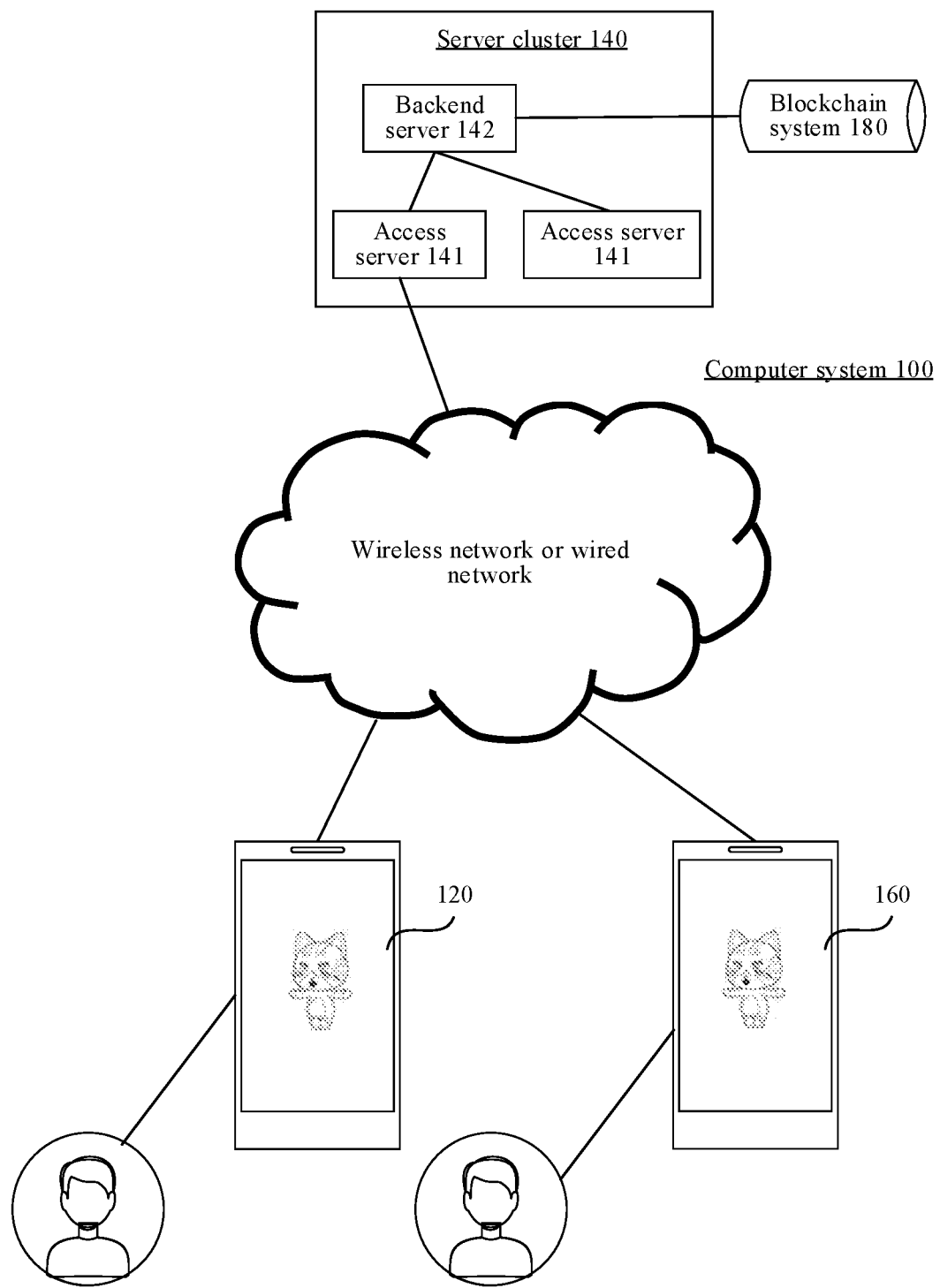
FIG. 1 is a structural block diagram of a computer system according to an embodiment.

FIG. 1 is a structural block diagram of a computer system 100 according to an embodiment. The computer system 100 may include a first terminal 120, a server cluster 140 and a second terminal 160.

The first terminal 120 is connected to the server cluster 140 through a wireless network or wired network. The first terminal 120 may be at least one of a smartphone, a game console, a desktop computer, a tablet computer, an e-book reader, a multimedia playback device or a laptop portable computer. An application program supporting a virtual pet may be installed and run on the first terminal 120. The first terminal 120 may be used by a first user, and the first user account may log in to the application program in the first terminal 120.

The server cluster 140 includes at least one of a server or a plurality of servers, a cloud computing platform, or a virtualization center. The server cluster 140 is configured to provide a backend service for the application program supporting a virtual pet. The server cluster 140 is responsible for primary computing work, and the first terminal 120 and the second terminal 160 are responsible for secondary computing work. However, the embodiment is not limited thereto. The server cluster 140 may be responsible for secondary computing work, and the first terminal 120 and the second terminal 160 may be responsible for primary computing work. Also, the server cluster 140, the first terminal 120 and the second terminal 160 may perform collaborative computing by using a distributed computing architecture among each other.

The server cluster 140 includes an access server 141 and a backend server 142. The access server 141 is configured to provide an access service and an information receiving/transmitting service for the first terminal 120 and the second terminal 160, and communicates useful information between a terminal and the backend server 142. The backend server 142 is configured to provide the backend service for the application program, such as, at least one of a game logic service, a material providing service, a virtual pet generating service, a virtual pet trading service, and a virtual pet breeding service. There may be one or more backend servers 142. When there are a plurality of backend servers 142, there are at least two backend servers 142 configured to provide different services, and/or there are at least two backend servers 142 configured to provide the same service. However, the embodiment is not limited thereto.

An application program supporting a virtual pet may be installed and run on the second terminal 160. The second terminal 160 may be used by a second user. A second user account may log in to the application program in the second terminal 160.

The first user account and the second user account are in the same virtual social network. That is, the first user account and the second user account may belong to the same team or the same organization, have a friend relationship or have temporary communication permission. In addition, the first user account and the second user account may belong to different teams, different organizations, or two hostile groups.

The application programs installed on the first terminal 120 and the second terminal 160 are the same, or the application programs installed on the two terminals are the same type of application programs on different control system platforms. The first terminal 120 may generally refer to one of a plurality of terminals, the second terminal 160 may generally refer to one of the plurality of terminals, and this embodiment is described using only the first terminal 120 and the second terminal 160 as examples. The terminal types of the first terminal 120 and the second terminal 160 may be the same or different. The following embodiments are described as examples in which the first terminal 120 and the second terminal 160 are smartphones.

A person skilled in the art may learn that, there may be more or fewer terminals. For example, there may be only one terminal, or there may be a plurality of terminals. The quantity or device type of the terminals is not limited to the embodiments herein.

Figure 2:
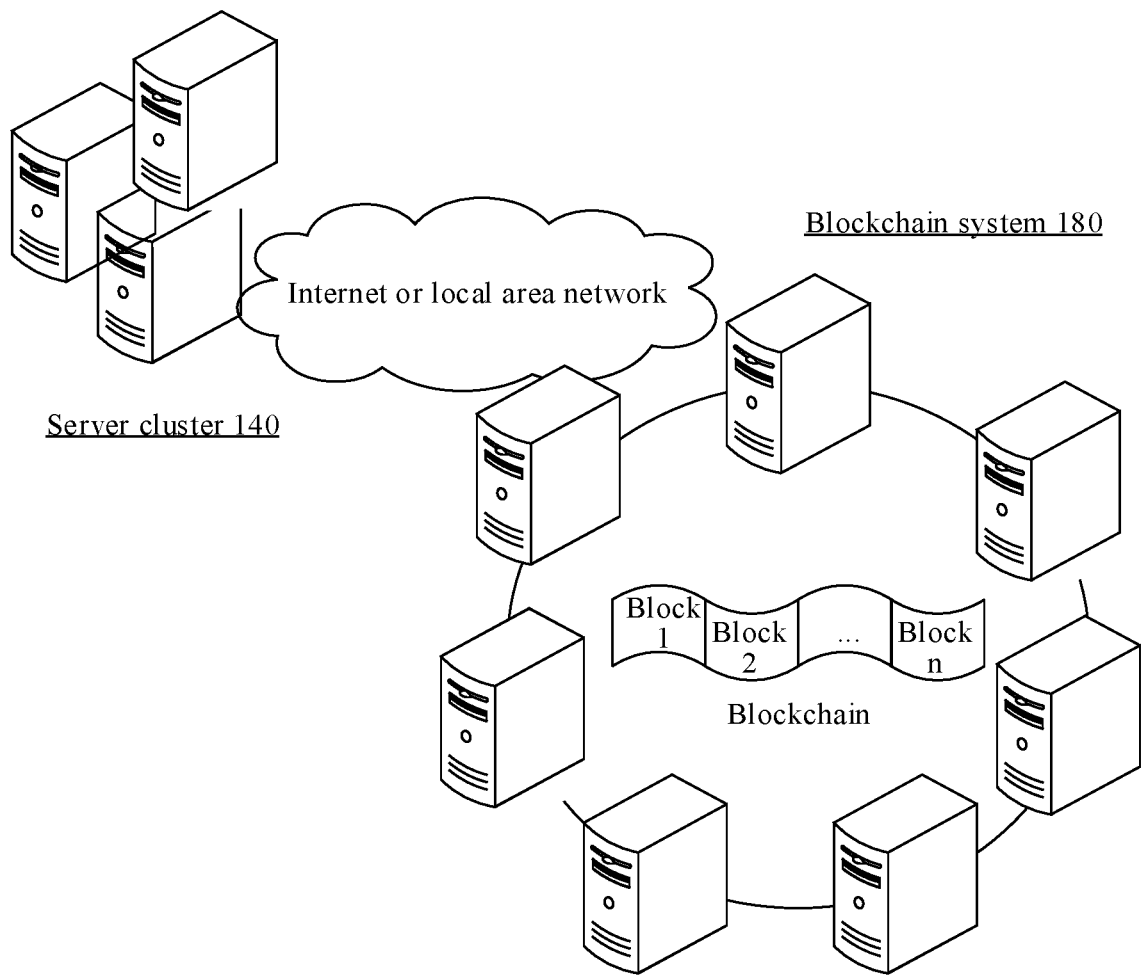
FIG. 2 is a structural block diagram of a computer system according to another embodiment.

In some embodiments, the server cluster 140 is configured to store information about each virtual pet, such as role information, genealogy information, and trading record. The role information includes at least one of a role identifier (for example, name) used for uniquely identifying the virtual pet, an image parameter used for representing a pet image of the virtual pet, and a preview used for representing the virtual pet. In some embodiments, as shown in FIG. 1 or FIG. 2, there may be many communication connections between the server cluster 140 and a blockchain system 180, and the server cluster 140 may store the information about each virtual pet in the blockchain system 180. In some embodiments, the server cluster 140 itself may alternatively be used as one node in the blockchain system 180 to run and store data.

Here, some of the terms used in the disclosure are introduced and described.

Virtual pet: a digital pet presented as a pet image in a cartoon form and/or an animal form. The virtual pet may be a two-dimensional digital pet or a three-dimensional digital pet. For example, a virtual pet is a three-dimensional virtual pet presented as a pet image in the form of a cartoon cat. In addition, there may be some virtual pets whose appearance may be generated randomly. For example, pet images of the zeroth-generation virtual pets are generated randomly. There may be some virtual pets whose appearance may be generated according to a genetic inheritance rule based on pet images of parental virtual pets and/or other ancestral virtual pets. For example, a pet image of a descendant virtual pet other than the zeroth-generation virtual pet is generated according to the genetic inheritance rule. Further, each virtual pet may have a unique gene sequence, and the gene sequence includes generation parameters for determining a pet image of the virtual pet. The gene sequence is also referred to as image parameters.

In some embodiments, pet information of each virtual pet is stored on a blockchain system, and is stored and authenticated through a consensus mechanism for a plurality of nodes on the blockchain system. The pet information may include a unique gene sequence of the virtual pet, at least one of identification information of the virtual pet, parent information of the virtual pet, generation information of the virtual pet, genealogy information of the virtual pet, historical transaction journal information of the virtual pet, event journal information of the virtual pet and other information about the virtual pet.

Because a gene sequence of each virtual pet is unique and information stored on a blockchain system is true and unique, a virtual pet has a collection attribute. Also, because pet information of a virtual pet is stored on a blockchain system, even if a virtual pet is a digital pet designed to be used in a first application program, the virtual pet can be conveniently migrated to a second application program and be used. Here, the first application program and the second application program are different application programs.

In some embodiments, a virtual pet is a digital pet displayed by an application program running on a terminal. The application program may include at least one of the following functions: capturing a virtual pet, generating a virtual pet, breeding a virtual pet, trading a virtual pet, fighting by using a virtual pet, carrying out augmented reality (AR) interaction by using a virtual pet, carrying out social communication by using a virtual pet, and carrying out AR education by using a virtual pet. In some embodiments, the application program is an application program for obtaining, breeding and/or trading a virtual pet based on a blockchain system. In some embodiments, the application program is a geolocation-based social game program and the social game program that provide at least one function among a plurality of functions, such as performing collection, growing, and/or fighting by using a virtual pet.

In some embodiments, a gene sequence determines features of a virtual pet. The above-mentioned features may include: extrinsic features and/or intrinsic features.

Extrinsic features may refer to features embodying a pet image of a virtual pet. That is, a virtual pet may include different body parts such as skin, speckles, ears, beards, patterns, eyes, and a mouth, and each of the body parts may have a variety of different extrinsic features. The extrinsic features may include visible features such as color, shape, texture and the like. For example, extrinsic features of skin may include different colors of white skin, red skin, orange skin, yellow skin, green skin, cyan skin, blue skin, purple skin and the like. In another example, extrinsic features of ears may include different shapes of long ears, short ears, rolled ears, folded ears, normal ears and the like.

Intrinsic features may refer to features intrinsic properties of a virtual pet. For example, intrinsic properties may include a variety of different properties such as an intelligence value, an attack power value, a defense value, a dexterity value, a magic value, a strength value, an endurance value, an agility value, a potential value, a speed value, a health point and the like.

A gene sequence of a virtual pet may include a set of parameter values used for generating a pet image of the virtual pet, and is also referred to as image parameters. For example, taking the virtual pet as a 3D virtual pet, the pet image of each virtual pet includes a plurality of types of 3D image materials. The types of 3D image materials may include different role parts and/or texture levels. Each 3D image material corresponds to a material identifier. Each type of 3D material identifier can be considered as a parameter value in the gene sequence. For example, if 3D body models of a 3D virtual pet are the same, the pet image of the 3D virtual pet includes at least 8 types of 3D image materials (also referred to as local feature): 3D body model, ear model, skin material, eye material, nose material, mouth material, beard material, body speckle material, and chest and abdomen pattern material. The pet image of the 3D virtual pet may further include tail material, external pendant material, and global feature. The tail material is a feature for determining a tail model of the virtual pet. For example, when the pet image is an animal type, the tail material may include a long and thin tail or a short and thick tail. The external pendant material is a feature for determining accessories of the virtual pet. The accessories include, but are not limited to, at least one of a backpack, glasses, handheld prop, belt, clothes, hat, shoes or head accessory. The global feature is an overall image feature for covering the body model of the virtual pet, and has the highest display priority.

When target image parameters include the global feature, the global feature covers the local feature and is completely displayed, that is, the local feature is hidden and not displayed. For example, when a pet cat has a superman global feature, a self-image of the cat is not displayed, while a pet image with a superman appearance is displayed instead.

Furthermore, the gene sequence includes at least one of a global feature parameter, a skin texture feature parameter, a skin color feature parameter, a belly texture feature parameter, a belly color feature parameter, an eye texture feature parameter, an eye color feature parameter, a mouth texture feature parameter, a mouth color feature parameter, a beard texture feature parameter, a beard color feature parameter, an ear feature parameter, a tail feature parameter, or a pendant feature parameter. The gene sequence can be represented by a plurality of key-value pairs arranged in order, and the key-value pairs can be in the form of (gene name, parameter value). In an example, the gene sequence may be represented as Gene=[(3D body model feature, default), (skin feature, smooth), (belly feature, pattern 1), (mouth texture feature, small canine teeth 1), (mouth color feature, red), (tail feature, stubby shape)].

A genetic inheritance rule, also referred to as a genetic rule, genetic algorithm, or genetic inheritance algorithm, is a rule of handing down pet images based on genetics of parental virtual pets and/or other ancestral virtual pets by imitating a genetic law of real creatures to generate a pet image of a filial virtual pet. In some embodiments, to ensure that each virtual pet is a unique customized virtual pet, each virtual pet has a unique gene sequence. In some embodiments, the genetic inheritance rule is a rule of recombining and deduplicating pet images of parental virtual pets and/or other ancestral virtual pets according to the genetic law to generate a pet image with a unique feature of a filial virtual pet. Deduplication refers to a mechanism of regenerating, when the same gene sequence as that of an existing virtual pet appears in a genetic process, a gene sequence of the virtual pet thereby ensuring genetic uniqueness of the virtual pet. Because the genetic inheritance rule imitates the genetic rule of real creatures, there are further restrictions in the breeding process, such as duration of pregnancy and forbidding breeding of close relatives.

In this embodiment, there are genetic genes between two virtual pets with a genetic relationship. Genetic genes refer to genes handed down from one of two virtual pets with a genetic relationship to the other. Features determined by genetic genes can be referred to as genetic features. Two virtual pets with a genetic relationship have the same genetic features, that is, have same image material features. For example, two virtual pets with a genetic relationship both have yellow skin. In another example, two virtual pets with a genetic relationship both have red skin and folded ears. There may be one or more genetic features, which is not limited to the embodiments of the disclosure. Usually, the closer the generations between two virtual pets, the more genetic features shared between them. Conversely, the further the generations between two virtual pets, the fewer genetic features shared between them.

Generation information of a virtual pet refers to information relating to generation of the virtual pet in the entire virtual pet worldview, which is determined by generations of a paternal virtual pet and a maternal virtual pet of the virtual pet. In some embodiments, the generation of a filial virtual pet is obtained by adding one to the maximum generation number of the paternal virtual pet and the maternal virtual pet. For example, if the paternal virtual pet is a $0^{th}$-generation virtual pet and the maternal virtual pet is a $4^{th}$-generation virtual pet, the filial virtual pet is a $5^{th}$-generation virtual pet. In some embodiments, the generation of a zeroth-generation virtual pet is the lowest. For example, the generation of the zeroth-generation virtual pet is 0. The generation of a non-zeroth-generation virtual pet is determined by generations of the parental virtual pets thereof. The generation of the filial virtual pet bred and generated by the parental virtual pets is higher than those of the parental virtual pets thereof. In an example, if only parental virtual pets of the same generation are allowed to breed and generate a filial virtual pet (that is, next-generation virtual pet), the generation of the filial virtual pet is equal to the generation of the parental virtual pets plus 1. For example, if the generations of the parental virtual pets are both 1, the generation of the filial virtual pet is 2. In another example, if the generations of the parental virtual pets are both 0, the generation of the filial virtual pet is 1. In another example, if not only parental virtual pets of the same generation are allowed to breed and generate a filial virtual pet (that is, next-generation virtual pet), that is, parental virtual pets of different generations are allowed to breed and generate a filial virtual pet, the generation of the filial virtual pet is equal to the generation of one of parental virtual pets with the higher generation plus 1. For example, when the generation of the paternal virtual pet is 0 and the generation of the maternal virtual pet is 2, the generation of the filial virtual pet is 3. In addition, the zeroth-generation virtual pet is not bred and generated by the paternal virtual pet and the maternal virtual pet, but is automatically generated by a virtual pet system. Therefore, the zeroth-generation virtual pet does not have a paternal virtual pet or a maternal virtual pet, and there are no other virtual pets that have higher generations than that of the zeroth-generation virtual pet and that have a genetic relationship with the zeroth-generation virtual pet.

Figure 3:
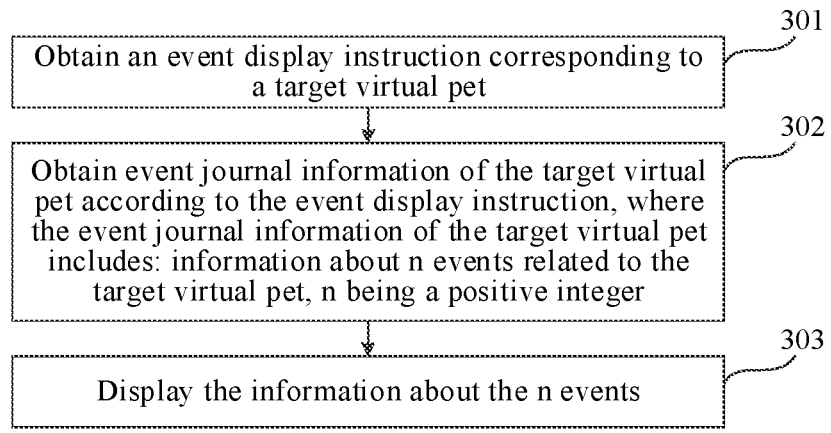
FIG. 3 is a flowchart of an information display method for a virtual pet according to an embodiment.

FIG. 3 is a flowchart of an information display method for a virtual pet according to an embodiment. The method may be applied to a terminal, such as the foregoing first terminal or second terminal. The method may include the following several steps:

Step 301. Obtaining an event display instruction corresponding to a target virtual pet.

The event display instruction refers to an instruction used for triggering display of event journal information. The event display instruction corresponding to the target virtual pet is an instruction used for triggering display of the event journal information of the target virtual pet.

In this embodiment, the target virtual pet may be any virtual pet in an application program. The target virtual pet may be a virtual pet owned by a current user account in the application program of the terminal, or may be a virtual pet owned by another user account, or may be a virtual pet not owned by any user account, for example, a virtual pet not captured by any user account, or a virtual pet not purchased by any user account in a pet store.

In addition, the event display instruction is not limited to this embodiment, and may include, for example, an instruction in any form such as a touch operation, voice, or a gesture. Taking the form of the touch operation as an example, the terminal may display a detail interface of the target virtual pet used for displaying detail information of the target virtual pet. The detail information includes, but is not limited to, at least one of the following: name, generation, attribute and so on.

In an example, the detail interface of the target virtual pet includes an event display control, which is an operation control used for triggering the event display instruction, such as a button or a slider. When the terminal obtains an operation signal corresponding to the event display control, the event display instruction corresponding to the target virtual pet is obtained. The foregoing operation signal may be tapping, pressing, sliding or another operation signal, which is not limited to this embodiment.

In another example, when the terminal obtains the sliding operation signal corresponding to the detail interface of the target virtual pet, the event display instruction corresponding to the target virtual pet is obtained. A direction of the foregoing sliding operation signal may be any one of upward, downward, leftward and rightward. Taking the direction of the sliding operation signal being upward as an example, the function of pulling up the detail interface of the target virtual pet to trigger display of the event journal information of the target virtual pet may be realized.

Step 302. Obtaining event journal information of the target virtual pet according to the event display instruction, where the event journal information of the target virtual pet includes information about n events related to the target virtual pet, where n is a positive integer.

In this embodiment, an event related to the target virtual pet refers to an event that occurs in a virtual scene provided by the application program and in which the target virtual pet participates.

For example, events related to the virtual pet may include, but are not limited to, at least one of the following: a bait purchase event, a capture event, a summons event, a birth event, a mating event, a breeding event or a trading event.

The bait purchase event may refer to an event of purchasing bait used for luring the virtual pet. In this embodiment, the form of the bait is not limited. For example, the bait for a virtual pet cat may be a virtual bell, and the bait for a virtual pet dog may be a virtual bone.

The capture event may refer to an event of capturing the virtual pet. After being captured by a user account, the virtual pet may be saved or kept in a backpack of the user account.

The summons event may refer to an event that the virtual pet is summoned from the backpack. The summoned virtual pet can perform other events, such as mating, breeding, fighting and so on.

The birth event may refer to an event of the birth of the virtual pet. In this embodiment, the virtual pet may be bred and generated by parental virtual pets according to a genetic inheritance rule.

The mating event may refer to an event that the virtual pet mates with a virtual pet of opposite sex to breed offspring. In this embodiment, one paternal virtual pet and one maternal virtual pet may breed and generate one or more filial virtual pets by mating. Here, the paternal virtual pet and the maternal virtual pet have different genders. The paternal virtual pet is male (or referred to as masculine), and the maternal virtual pet is female (or referred to as feminine). The gender of the virtual pet may be specified by a user or automatically determined by the virtual pet system. However, the embodiment for determining the gender is not limited thereto.

The breeding event may refer to an event that the virtual pet and a virtual pet of opposite sex breed and generate offspring.

The trading event may refer to an event of exchanging or trading virtual pets between different user accounts. The application program may provide the function of trading the virtual pets to help different players exchange or trade the virtual pets. Virtual currency (such as game currency or coupon) or real currency may be used for trading the virtual pets, but the trading event is not limited to this embodiment.

The foregoing events related to the virtual pet are only examples, and different events may be included depending on the application programs or products.

Step 303. Displaying the information about the n events.

The terminal displays the information about the n events included in the event journal information after obtaining the event journal information of the target virtual pet.

In an example, the terminal displays the information about the n events in the form of cards. That is, the terminal displays respective corresponding cards of the n events. Specifically, the card corresponding to the $i^{th}$ event of the n events includes the information about the $i^{th}$ event, where i is a positive integer less than or equal to n. In addition, the foregoing cards may be presented in the form of a list.

Furthermore, the terminal may display the event journal information of the target virtual pet in the detail interface of the target virtual pet or display an event journal interface of the target virtual pet, and display the event journal information of the target virtual pet in the event journal interface of the target virtual pet.

Taking the $i^{th}$ event as an example, the information about the $i^{th}$ event may include at least one of the following elements: time, place, character and content. The time may refer to a time when the event occurs, for example, in the form of HH: MM MM/DD/YY. The time may be time in the virtual world or in the real world. The place may refer to a place where the event occurs, such as xx stadium, and the place may be a place in a virtual scene provided by the application program or in the real world. The character may include at least one of the user, the virtual pet or the virtual item related to the event. The user refers to a user of the application program, and when the application program is a game application program, the user may also be referred to as a player. The content may refer to details of the event. For different events, content of the events may differ correspondingly. For example, the content of the events may include events such as purchase, summons, capture, birth, mating, breeding and transaction.

In some embodiments, the foregoing step 303 may include the following sub-steps.

1. Obtaining, for an $i^{th}$ event of the n events, an event type of the $i^{th}$ event, i being a positive integer less than or equal to n.

The event types may include, but are not limited to, at least one of the following: a bait purchase event, a capture event, a summons event, a birth event, a mating event, a breeding event, or a trading event.

2. Displaying an event template corresponding to the event type of the $i^{th}$ event in an event display interface.

Each event type has a corresponding event template. An event template is used for specifying a display format of information about an event.

3. Filling up or completing the event template with information about the $i^{th}$ event to obtain display content of the $i^{th}$ event.

By filling the event template with the information about the event for display, information about events of the same event type can be displayed in the same format, which makes it more standardized and easy to be accepted by users.

For example, several event templates are introduced and described below.

1. An event template corresponding to the bait purchase event may be as follows:

(time), (player name) purchased (virtual item name) at (place).

For example: at 12:59 on Jan. 1, 2018, Crazyman purchased the bell AZ2361 at Block C of Shenzhen Bay Stadium.

2. An event template corresponding to the capture event may be as follows:

(time), (player name) captured (virtual pet name) at (place).

For example: at 10:20 on Jan. 3, 2018, Nanshan Monster Hunter captured Fortune Cat Lucky at Pudong Airport.

3. An event template corresponding to the summons event may be as follows:

(time), (player name) summoned (virtual pet name) at (place).

For example: at 10:25 on Jan. 3, 2018, Nanshan Monster Hunter summoned Fortune Cat Lucky at Pudong Airport.

4. An event template corresponding to the birth event may be as follows:

(time), (virtual pet name) was born at (place). The father is (virtual pet name) of (player name), and the mother is (virtual pet name) of (player name).

For example: at 15:02 on Feb. 10, 2018, Magic Cat 123 was born at the stadium of Sun Yat-sen University. The father is Plump Cat Tony of Beard Beep Man, and the mother is Fortune Cat Kitty of the Powerful Girl.

5. An event template corresponding to the mating event may be as follows:

(time), bred with (virtual pet name) of (player name) at (place).

For example: at 10:15 on Jan. 20, 2018, bred with Plump Cat Tony of Beard Beep Man at the library of Sun Yat-sen University.

6. An event template corresponding to the breeding event may be as follows:

(time), gave birth to (virtual pet name) with (virtual pet name) of (player name).

For example: at 15:02 on Feb. 10, 2018, gave birth to Magic Cat 123 with Plump Cat Tony of Beard Beep Man.

7. An event template corresponding to the trading event may be as follows:

(time), traded by (player name) to (player name) with (virtual item name).

For example: at 8:58 on Feb. 2, 2018, traded by the Powerful Girl to Beard Beep Man with a 2000-point coupon.

In some embodiments, for a zeroth-generation virtual pet, an event template corresponding to an event of generating the zeroth-generation virtual pet may be as follows:

(time), blockchain generated this zeroth-generation cat.

For example: at 12:30 Jan. 3, 2018, blockchain generated this zeroth-generation cat.

In some embodiments, a virtual pet may be further obtained through an activity. An event template corresponding to an event of obtaining the virtual pet may be as follows:

(time), obtained by (player name) through an appointment activity.

For example: at 12:30 on Jan. 3, 2018, obtained by the Powerful Girl through an appointment activity.

The correspondence between the foregoing events and the event templates is only an example. In actual products, different types of events may be set according to various requirements, and corresponding event templates may be set, which are not limited to the embodiments of the disclosure.

In some embodiments, the display content of the $i^{th}$ event includes identification information of a user account related to the $i^{th}$ event. The identification information of the user account may be an avatar corresponding to the user account, a user name corresponding to the user account, the user account, or other information that can represent the user account.

After displaying the information about the $i^{th}$ event, the terminal may further perform following steps of obtaining an operation signal corresponding to the identification information of the user account, and displaying a detail interface of the user account according to the operation signal. For example, tapping the avatar corresponding to the user account can display the detail interface of the user account.

In some embodiments, the display content of the $i^{th}$ event includes identification information of a virtual pet related to the $i^{th}$ event. The identification information of the virtual pet may be a name of the virtual pet, an icon of the virtual pet, or other information that can represent the virtual pet.

After displaying the information about the $i^{th}$ event, the terminal may further perform following steps of obtaining an operation signal corresponding to the identification information of the virtual pet, and displaying a detail interface of the virtual pet according to the operation signal. For example, tapping the name of the virtual pet can display the detail interface of the virtual pet.

In some embodiments, the information about the n events included in the event journal information of the target virtual pet is sorted according to occurrence time points of the n events. For example, the information is sorted according to the occurrence time points of the n events in descending order, and thereby displaying the most recent events at the top.

Figure 4:
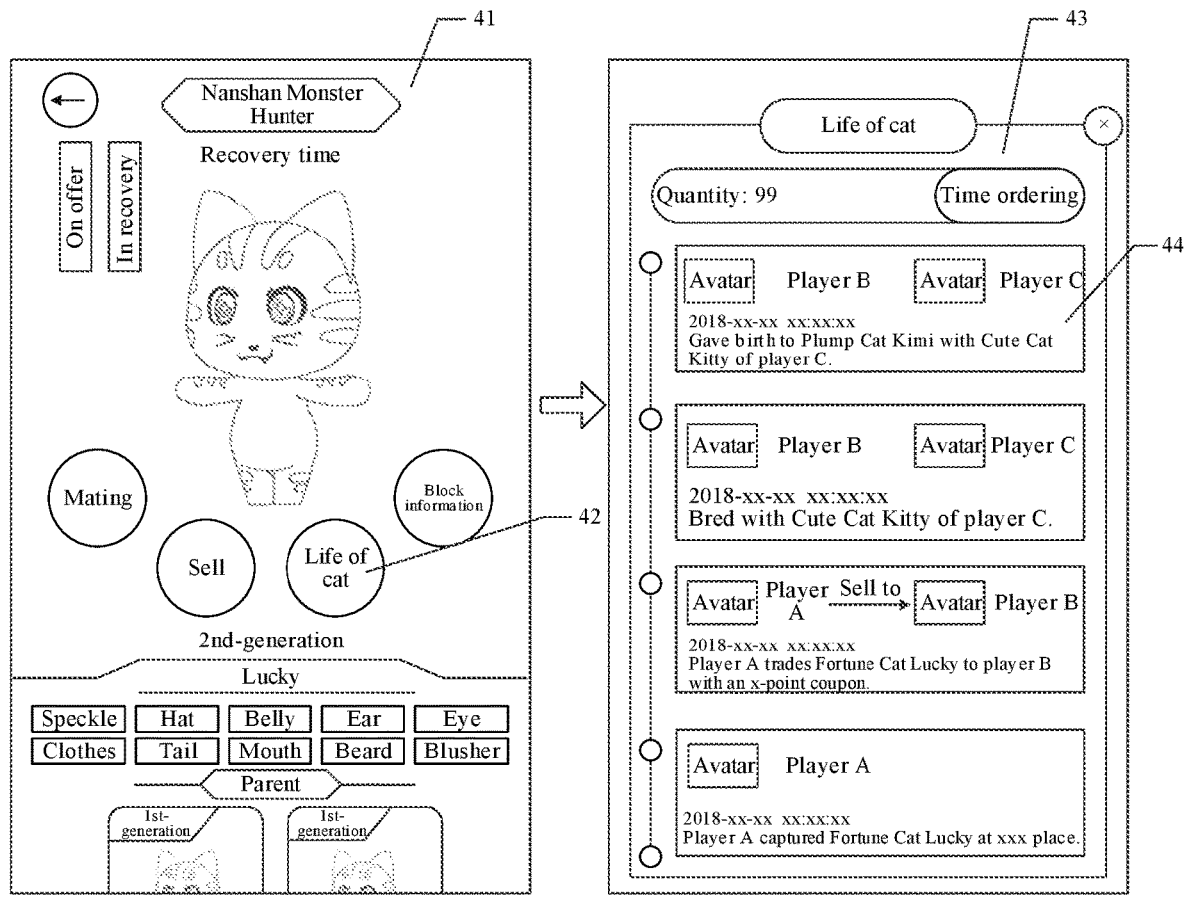
FIG. 4 is a schematic diagram of an interface that displays event journal information of a virtual pet according to an embodiment.

FIG. 4 is a schematic diagram of an interface that displays event journal information of a virtual pet according to an embodiment. Taking a virtual pet cat as an example, a terminal displays a detail interface 41 of the virtual pet cat Lucky. The detail interface 41 includes an operation control used for triggering an event display instruction, such as a "life of cat" button 42 shown in FIG. 4. When a user taps the "life of cat" button 42, the terminal displays an event journal interface 43. The event journal interface 43 includes several cards 44, and each card 44 displays information about an event related to the virtual pet cat Lucky, including information such as time, place, character, and content of the event.

By obtaining event journal information of a target virtual pet that includes information about several events related to the target virtual pet, and then displaying the event journal information, a display function of the event journal information of the virtual pet is realized, so that the displayed information content of the virtual pet is expanded.

In addition, the related art is usually based on a user account, and information about events related to the user account is displayed. In this embodiment, information about events related to the virtual pet is displayed, thereby providing a novel event display policy, so as to make the products have more abundant functions.

Figure 5:
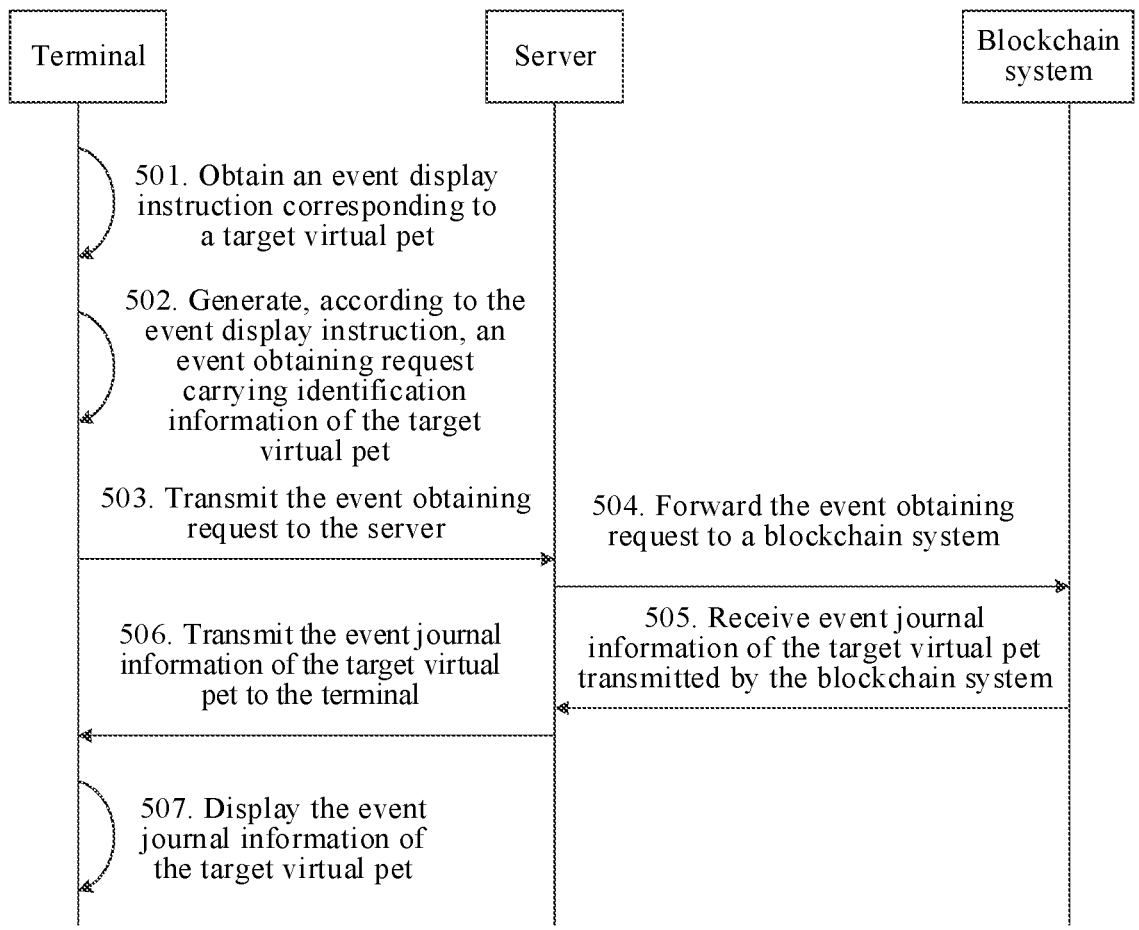
FIG. 5 is a sequence chart of an information display method for a virtual pet according to an embodiment.

FIG. 5 is a flowchart of an information display method for a virtual pet provided by an embodiment. The method may be applied to the system architecture shown in FIG. 1. The method may include the following several steps:

Step 501. A terminal obtains an event display instruction corresponding to a target virtual pet.

Step 502. The terminal generates, according to the event display instruction, an event obtaining request carrying identification information of the target virtual pet.

The identification information of the target virtual pet is used for uniquely identifying the target virtual pet. Each virtual pet has its own identification information, and different virtual pets have different identification information. The identification information of the virtual pet may be a character string, and the character string may be formed by at least one element of numbers, letters, and symbols.

The event obtaining request is used for requesting to obtain event journal information of the target virtual pet.

Step 503. The terminal transmits the event obtaining request to a server.

Step 504. The server receives the event obtaining request from the terminal and transmits the event obtaining request to a blockchain system.

The server obtains, after receiving the event obtaining request transmitted by the terminal, the event journal information of the target virtual pet according to the identification information of the target virtual pet carried in the event obtaining request. In an embodiment, the event journal information of the virtual pet is stored in the blockchain system, and the server may obtain the event journal information of the target virtual pet from the blockchain system.

The blockchain system refers to a system that stores data by using a blockchain technology. The blockchain technology is also referred to as a distributed ledger technology, which is an Internet database technology and features decentralization, openness and transparency, enabling all users to participate in database record. The blockchain technology may be a distributed infrastructure and computing method that verifies and stores data by using a blockchain data structure. The blockchain system generates and updates data by using a distributed node consensus algorithm, ensures the security of data transmission and access using a method of cryptology, and programs and operates data by using a smart contract formed by automation script code. The data stored in the blockchain system has very high stability and reliability, and the blockchain system is a database that cannot be tampered with and is reliable. Therefore, compared with storing the event journal information of the virtual pet conventionally by directly using a backend server of an application program, storing the event journal information of the virtual pet by using the blockchain system is conducive to improving the security and reliability of the event journal information.

Step 505. The server receives the event journal information of the target virtual pet corresponding to the event obtaining request from the blockchain system.

Specifically, after receiving the event obtaining request forwarded by the server, the blockchain system obtains, according to the identification information of the target virtual pet carried in the event obtaining request, from event journal information of all virtual pets stored in the blockchain system, the event journal information stored corresponding to the identification information of the target virtual pet as the event journal information of the target virtual pet and transmits the event journal information to the server.

The event journal information of the target virtual pet transmitted by the blockchain system to the server includes information about n events related to the target virtual pet, where n is a positive integer. The explanation and description of the event and information about the event may be referred to the foregoing embodiments.

Step 506. The server receives the event journal information of the target virtual pet from the blockchain system and transmits the event journal information to the terminal.

Step 507. The terminal displays the event journal information of the target virtual pet received from the server.

The display method for the event journal information may refer to the foregoing embodiments.

Figure 6:
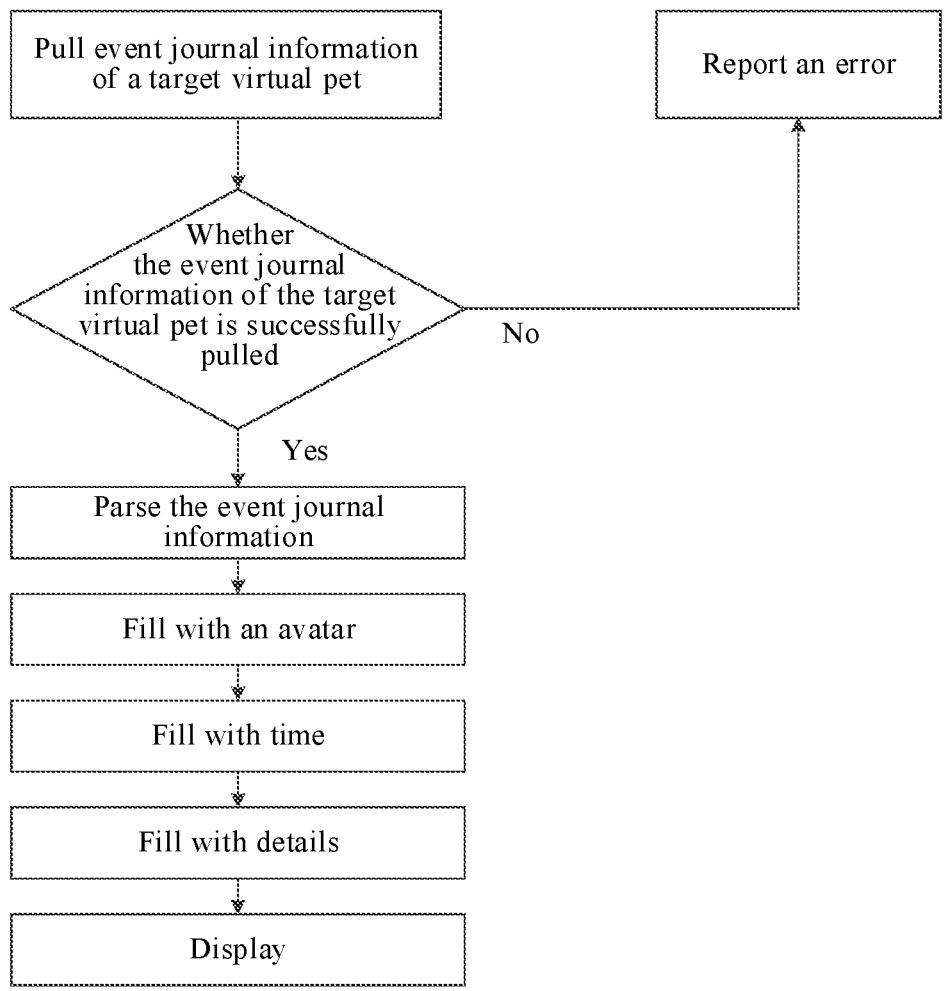
FIG. 6 is a flowchart of displaying event journal information of a virtual pet according to an embodiment.

FIG. 6 is a flowchart of displaying event journal information of a virtual pet according to an embodiment. The terminal requests the server to pull the event journal information of the target virtual pet. If the terminal fails to pull the event journal information, the process ends or an error message may be delivered to a user. If the terminal succeeds in pulling the event journal information, the event journal information of the target virtual pet is parsed, including extracting elements such as time, place, task, and content from the information about each event, and a corresponding event template is obtained according to the event type of the event, where the event template may include three parts, namely, an upper part, a middle part, and a lower part. The upper part includes an avatar of a user account related to the event, the middle part includes the time of the event, and the lower part includes the details of the event; and then the terminal fills the event template with the information about the event to obtain and display the corresponding display content.

Here, the event journal information of the virtual pet is stored in the blockchain system, thereby fully ensuring the security and reliability of the event journal information of the virtual pet.

As described above with reference to FIG. 5, a method for requesting, by a terminal, to obtain event journal information of a virtual pet when the event journal information is stored by using a blockchain system is introduced. The following introduces and describes a storage process of event journal information of a virtual pet. The storage process may be as follows:

1. When a server detects that a target event related to a target virtual pet, obtain information about the target event.

The target event may be any event related to the target virtual pet. The server and the blockchain system may record all events in the entire life cycle of the target virtual pet, or may only record some events in the entire life cycle of the target virtual pet, which may be set according to an actual product requirement or by a user. However, the embodiment is not limited thereto.

2. Transmit an event storage request to the blockchain system.

Identification information of the target virtual pet and the information about the target event are carried in the event storage request. The blockchain system is used for correspondingly storing the identification information of the target virtual pet and the information about the target event. After obtaining the event storage request, the blockchain system detects, according to the identification information of the target virtual pet, whether event journal information of the target virtual pet has been stored. In a case where the event journal information of the target virtual pet has been stored, the information about the target event is added to the event journal information of the target virtual pet. Alternatively, in a case where the event journal information of the target virtual pet has not been stored, the event journal information of the target virtual pet is created, and then the information about the target event is added to the event journal information of the target virtual pet.

According to the embodiments described above, the server actively reports to the blockchain system the information about the recorded event related to the virtual pet, so as to obtain and provide the information to the terminal when there is a need.

The following describes an apparatus for executing the method embodiments described above, according to an embodiment.

Figure 7:
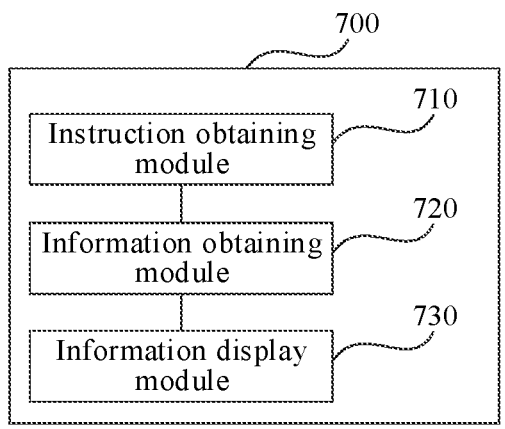
FIG. 7 is a block diagram of an information display apparatus for a virtual pet according to an embodiment.

FIG. 7 is a block diagram of an information display apparatus for a virtual pet according to an embodiment. The apparatus has functions of implementing the foregoing method examples on the terminal side. The functions may be implemented by using hardware, or may be implemented by hardware executing corresponding software. The apparatus 700 may include an instruction obtaining module 710, an information obtaining module 720 and an information display module 730.

The instruction obtaining module 710 is configured to obtain an event display instruction corresponding to a target virtual pet.

The information obtaining module 720 is configured to obtain event journal information of the target virtual pet according to the event display instruction, the event journal information of the target virtual pet including information about n events related to the target virtual pet, where n is a positive integer.

The information display module 730 is configured to display the information about the n events.

According to the above described embodiment, by obtaining event journal information of a target virtual pet that includes information about several events related to the target virtual pet, and then displaying the event journal information, a display function of the event journal information of the virtual pet is realized, so that the displayed information content of the virtual pet is expanded.

In an embodiment, the information display module 730 may be further configured to obtain, for an $i^{th}$ event of the n events, an event type of the $i^{th}$ event, i being a positive integer less than or equal to n; display an event template corresponding to the event type of the $i^{th}$ event in an event display interface; and fill the event template with information about the $i^{th}$ event to obtain display content of the $i^{th}$ event.

The display content of the $i^{th}$ event includes identification information of a user account related to the $i^{th}$ event; and the information display module 730 may be further configured to obtain an operation signal corresponding to the identification information of the user account; and display a detail interface of the user account according to the operation signal.

The event type includes at least one of the following: a bait purchase event, a capture event, a summons event, a birth event, a mating event, a breeding event, or a trading event.

In an embodiment, the information obtaining module 720 may be configured to: generate, according to the event display instruction, an event obtaining request carrying identification information of the target virtual pet; transmit the event obtaining request to a server, where the event obtaining request is used for triggering the server to obtain the event journal information of the target virtual pet from a blockchain system; and receive the event journal information of the target virtual pet transmitted by the server.

Here, the information about the n events may be sorted according to occurrence time points of the n events.

Figure 8:
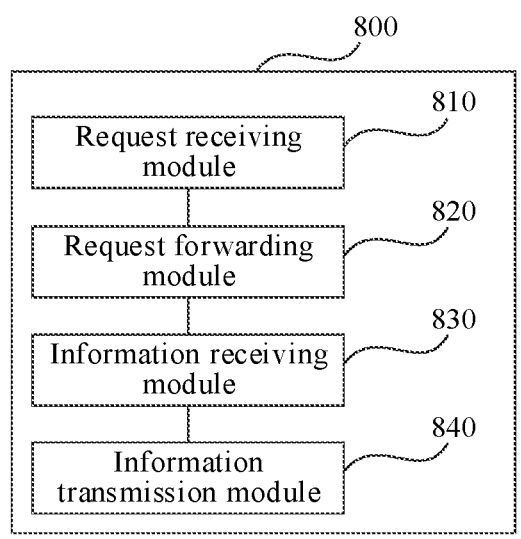
FIG. 8 is a block diagram of an information display apparatus for a virtual pet according to an embodiment.

FIG. 8 is a block diagram of an information display apparatus for a virtual pet according to an embodiment. The apparatus may be implemented a server side. The functions may be implemented by using hardware, or may be implemented by hardware executing corresponding software. The apparatus 800 may include a request receiving module 810, a request forwarding module 820, an information receiving module 830 and an information transmission module 840.

The request receiving module 810 is configured to receive an event obtaining request that is transmitted by a terminal and that carries identification information of a target virtual pet.

The request forwarding module 820 is configured to forward the event obtaining request to a blockchain system.

The information receiving module 830 is configured to receive event journal information of the target virtual pet transmitted by the blockchain system, the event journal information of the target virtual pet including information about n events related to the target virtual pet, n being a positive integer.

The information transmission module 840 is configured to transmit the event journal information of the target virtual pet to the terminal for display.

Here, by obtaining event journal information of a target virtual pet that includes information about several events related to the target virtual pet, and then displaying the event journal information, a display function of the event journal information of the virtual pet is realized, so that the displayed information content of the virtual pet is expanded.

In an embodiment, the apparatus 800 may further include an event obtaining module and an event storage module.

The event obtaining module is configured to obtain, in a case of detecting that a target event related to the target virtual pet occurs, information about the target event.

The event storage module is configured to transmit an event storage request to the blockchain system, where the identification information of the target virtual pet and the information about the target event are carried in the event storage request, and the blockchain system is used for correspondingly storing the identification information of the target virtual pet and the information about the target event.

In the foregoing embodiments, the apparatus implements various functions of the apparatus, and the division of the apparatus according to functional modules is only used as an example for the ease of description. In a practical application, the functions may be allocated to and performed by different functional modules according to requirements. That is, an internal structure of the apparatus may be divided into different function modules, to perform all or some of the functions described above.

Figure 9:
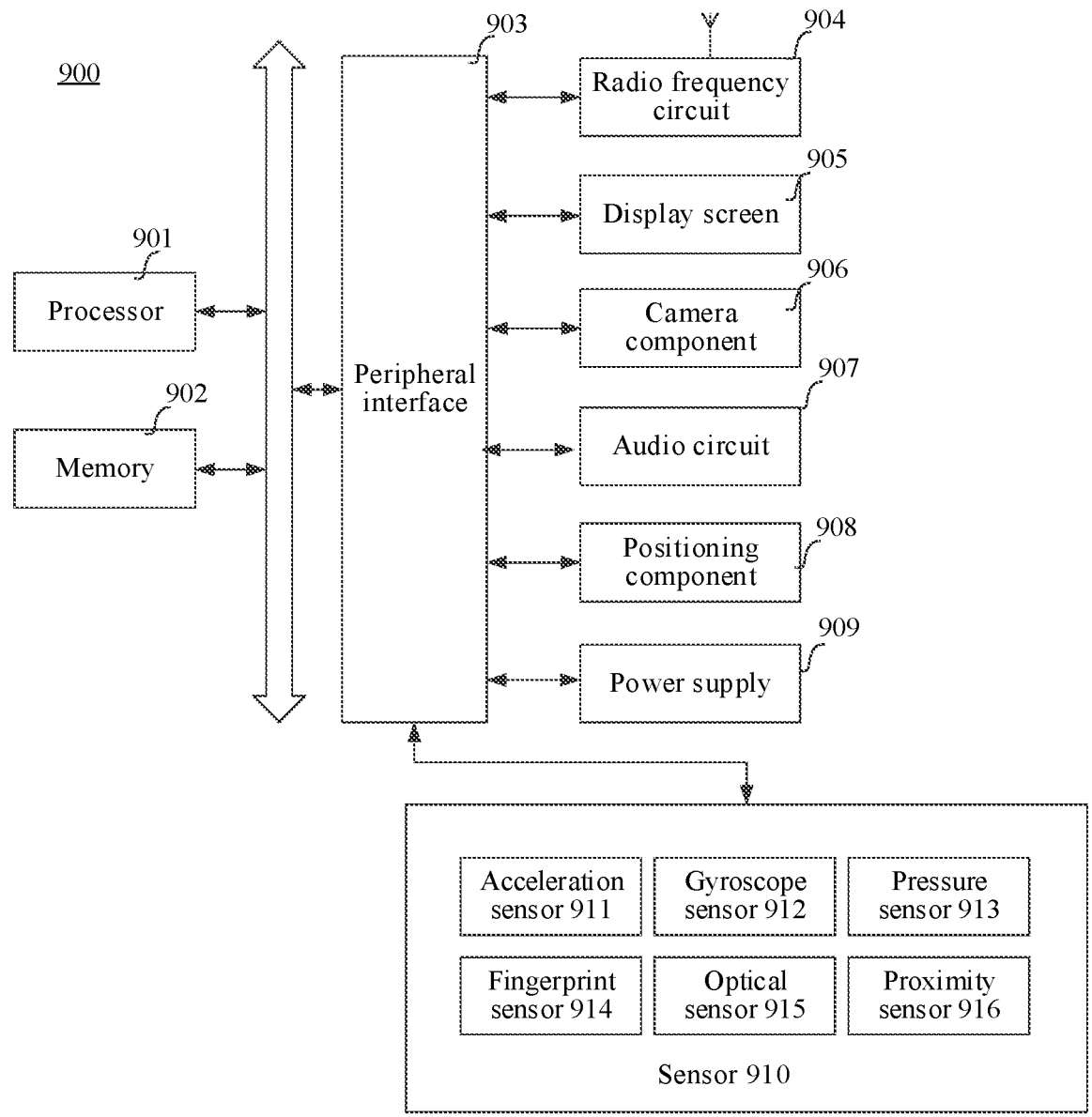
FIG. 9 is a structural block diagram of a terminal according to an embodiment.

FIG. 9 is a structural block diagram of a terminal 900 according to an embodiment. The terminal 900 may be a mobile phone, a game console, a tablet computer, a multimedia playback device, a personal computer (PC) or the like.

The terminal 900 includes a processor 901 and a memory 902.

The processor 901 may include one or more processing cores, for example, a 4-core processor or an 8-core processor. The processor 901 may be implemented in at least one hardware form of a digital signal processor (DSP), a field programmable gate array (FPGA), and a programmable logic array (PLA). The processor 901 may include a main processor and a coprocessor. The main processor is configured to process data in an awake state, also referred to as a central processing unit (CPU), and the coprocessor is a low-power processor configured to process data in a standby state. In some embodiments, the processor 901 may be integrated with a graphics processing unit (GPU). The GPU is configured to be responsible for rendering and drawing content for a display. In some embodiments, the processor 901 may further include an artificial intelligence (AI) processor. The AI processor is configured to process a computing operation related to machine learning.

The memory 902 may include one or more computer-readable storage medium. The computer-readable storage medium may be non-transient. The memory 902 may further include a high-speed random access memory and a non-volatile memory such as one or more magnetic disk storage devices and a flash storage device. In some embodiments, the non-transitory computer-readable storage medium in the memory 902 is configured to store at least one program code, and the at least one program code is configured to be executed by the processor 901 to implement the method according to the embodiments provided above.

In some embodiments, the terminal 900 may further include a peripheral interface 903 and at least one peripheral device. The processor 901, the memory 902, and the peripheral interface 903 may be connected through a bus or a signal cable. Each peripheral device may be connected to the peripheral interface 903 through a bus, a signal cable, or a circuit board. Specifically, the peripheral device includes: at least one of a radio frequency (RF) circuit 904, a touch display screen 905, a camera component 906, an audio circuit 907, a positioning component 908, and a power supply 909.

The peripheral interface 903 may be configured to connect at least one peripheral device related to input/output (I/O) to the processor 901 and the memory 902. In some embodiments, the processor 901, the memory 902, and the peripheral interface 903 are integrated into a same chip or circuit board, and in some other embodiments, any one or two of the processor 901, the memory 902, and the peripheral interface 903 may be implemented on an independent chip or circuit board. However, the embodiments of the disclosure are not limited thereto.

The RF circuit 904 is configured to receive and transmit an RF signal, which is also referred to as an electromagnetic signal. The RF circuit 904 communicates with a communication network and another communication device by using the electromagnetic signal. The RF circuit 904 converts an electric signal into an electromagnetic signal for transmission, or converts a received electromagnetic signal into an electric signal. In addition, the RF circuit 904 includes an antenna system, an RF transceiver, one or more amplifiers, a tuner, an oscillator, a digital signal processor, a codec chip set, a subscriber identity module card, and the like. The RF circuit 904 may communicate with other devices through at least one wireless communication protocol. The wireless communication protocol includes, but is not limited to, a metropolitan area network, various generations of mobile communication networks (2G, 3G, 4G, and 5G), a wireless local area network and/or a wireless fidelity (Wi-Fi) network. In some embodiments, the RF circuit 904 may also include a circuit related to near field communication (NFC). However, the RF circuit is not limited thereto.

The display screen 905 is configured to display a user interface (UI). The UI may include a graph, a text, an icon, a video, and any combination thereof. When the display screen 905 is a touch display screen, the display screen 905 is further capable of acquiring a touch signal on or above a surface of the display screen 905. The touch signal may be inputted to the processor 901 for processing as a control signal. In this case, the display screen 905 may be further configured to provide a virtual button and/or a virtual keyboard, which is also referred to as a soft button and/or a soft keyboard. In some embodiments, there may be one display screen 905 disposed on a front panel of the terminal 900. In some other embodiments, there may be at least two display screens 905 disposed on different surfaces of the terminal 900 or in a folded design. In other embodiments, the display screen 905 may be a flexible display screen disposed on a curved surface or a folded surface of the terminal 900. The display screen 905 may be further set in a non-rectangular irregular pattern, namely, a special-shaped screen. The display screen 905 may be configured using a material such as a liquid crystal display (LCD), an organic light-emitting diode (OLED), or the like.

The camera component 906 is configured to acquire an image or a video. The camera component 906 includes a front-facing camera and a rear-facing camera. Generally, the front-facing camera is disposed on the front panel of the computer device, and the rear-facing camera is disposed on a back face of the computer device. In some embodiments, there are at least two rear-facing cameras, which are respectively any one of a main camera, a depth of field camera, a wide-angle camera, and a telephoto camera, to implement a background blurring function by fusing the main camera and the depth of field camera, and panoramic shooting and virtual reality (VR) shooting functions or other fusing shooting functions by fusing the main camera and the wide-angle camera. In some embodiments, the camera component 906 may further include a flash. The flash may be a single color temperature flash, or may be a double color temperature flash. The double color temperature flash is a combination of a warm light flash and a cold light flash, and may be used for light compensation under different color temperatures.

The audio circuit 907 may include a microphone and a speaker. The microphone is configured to acquire sound waves of a user and an environment, and convert the sound waves into electrical signals and input the electrical signals into the processor 901 for processing, or input the electrical signals into the RF circuit 904 to implement speech communication. For the purpose of stereo acquisition or noise reduction, there may be a plurality of microphones, disposed at different parts of the terminal 900 respectively. The microphone may be further an array microphone or an omnidirectional acquisition microphone. The speaker is configured to convert electrical signals from the processor 901 or the RF circuit 904 into sound waves. The speaker may be a thin-film speaker, or may be a piezoelectric ceramic speaker. When the speaker is the piezoelectric ceramic speaker, electrical signals not only can be converted into sound waves that can be heard by human, but also can be converted into sound waves that cannot be heard by human for ranging and other uses. In some embodiments, the audio circuit 907 may also include an earphone jack.

The positioning component 908 is configured to determine a current geographic location of the terminal 900 to implement navigation or a location based service (LBS). The positioning component 908 may be a positioning component based on the Global Positioning System (GPS) of the United States, the BeiDou system of China, the GLONASS System of Russia, or the GALILEO System of the European Union.

The power supply 909 is configured to supply power for various components in the terminal 900. The power supply 909 may be an alternating current, a direct current, a disposable battery, or a rechargeable battery. When the power supply 909 includes a rechargeable battery, the rechargeable battery may be a wired rechargeable battery or a wireless rechargeable battery. The rechargeable battery may be further configured to support a quick charge technology.

In some embodiments, the terminal 900 may also include one or more sensors 910. The one or more sensors 910 include, but are not limited to, an acceleration sensor 911, a gyroscope sensor 912, a pressure sensor 913, a fingerprint sensor 914, an optical sensor 915, and a proximity sensor 916.

The acceleration sensor 911 may detect accelerations on three coordinate axes of a coordinate system configured in the terminal 900. For example, the acceleration sensor 911 may be configured to detect components of the gravity acceleration on the three coordinate axes. The processor 901 may control, according to a gravity acceleration signal acquired by the acceleration sensor 911, the touch display screen 905 to display the user interface in a frame view or a portrait view. The acceleration sensor 911 may be further configured to acquire game or user motion data.

The gyroscope sensor 912 may detect a body direction and a rotation angle of the terminal 900, and may acquire a 3D action of the user on the terminal 900 together with the acceleration sensor 911. The processor 901 may implement the following functions according to the data acquired by the gyroscope sensor 912: motion sensing (such as changing the UI according to a tilt operation of the user), image stabilization during shooting, game control, and inertial navigation.

The pressure sensor 913 may be disposed on a side frame of the terminal 900 and/or a lower layer of the touch display screen 905. When the pressure sensor 913 is disposed on the side frame of the terminal 900, a holding signal of the user to the terminal 900 may be detected, and left/right hand identification or a quick action may be performed by the processor 901 according to the holding signal acquired by the pressure sensor 913. When the pressure sensor 913 is disposed on the lower layer of the touch display screen 905, the processor 901 controls an operable control on the UI interface according to a pressure operation of the user on the touch display screen 905. The operable control includes at least one of a button control, a scroll bar control, an icon control or a menu control.

The fingerprint sensor 914 is configured to acquire a user's fingerprint, and the processor 901 identifies a user's identity according to the fingerprint acquired by the fingerprint sensor 914, or the fingerprint sensor 914 identifies a user's identity according to the acquired fingerprint. When the identity of the user is identified as a trusted identity, the processor 901 authorizes the user to perform a related sensitive operation. The sensitive operation includes unlocking a screen, viewing encryption information, downloading software, payment, changing settings, and the like. The fingerprint sensor 914 may be disposed on a front face, a back face, or a side face of the terminal 900. When a physical button or a vendor logo is disposed on the terminal 900, the fingerprint sensor 914 may be integrated together with the physical button or the vendor logo.

The optical sensor 915 is configured to acquire ambient light intensity. In an embodiment, the processor 901 may control the display brightness of the touch display screen 905 according to the ambient light intensity acquired by the optical sensor 915. Specifically, when the ambient light intensity is relatively high, the display brightness of the touch display screen 905 is turned up. When the ambient light intensity is relatively low, the display brightness of the touch display screen 905 is turned down. In another embodiment, the processor 901 may further dynamically adjust a camera parameter of the camera component 906 according to the ambient light intensity acquired by the optical sensor 915.

The proximity sensor 916, also referred to as a distance sensor, may be disposed on a front panel of the terminal 900. The proximity sensor 916 is configured to acquire a distance between a user and the front surface of the terminal 900. In an embodiment, when the proximity sensor 916 detects that the distance between the user and the front surface of the terminal 900 gradually decreases, the touch display screen 905 is controlled by the processor 901 to switch from a screen-on state to a screen-off state. When the proximity sensor 916 detects that the distance between the user and the front surface of the terminal 900 gradually increases, the touch display screen 905 is controlled by the processor 901 to switch from the screen-off state to the screen-on state.

A person skilled in the art may understand that the structure shown in FIG. 9 does not constitute a limitation on the terminal 900, and the terminal may include more or fewer components than those shown in the figure, or some components may be combined, or a different component deployment may be used.

Figure 10:
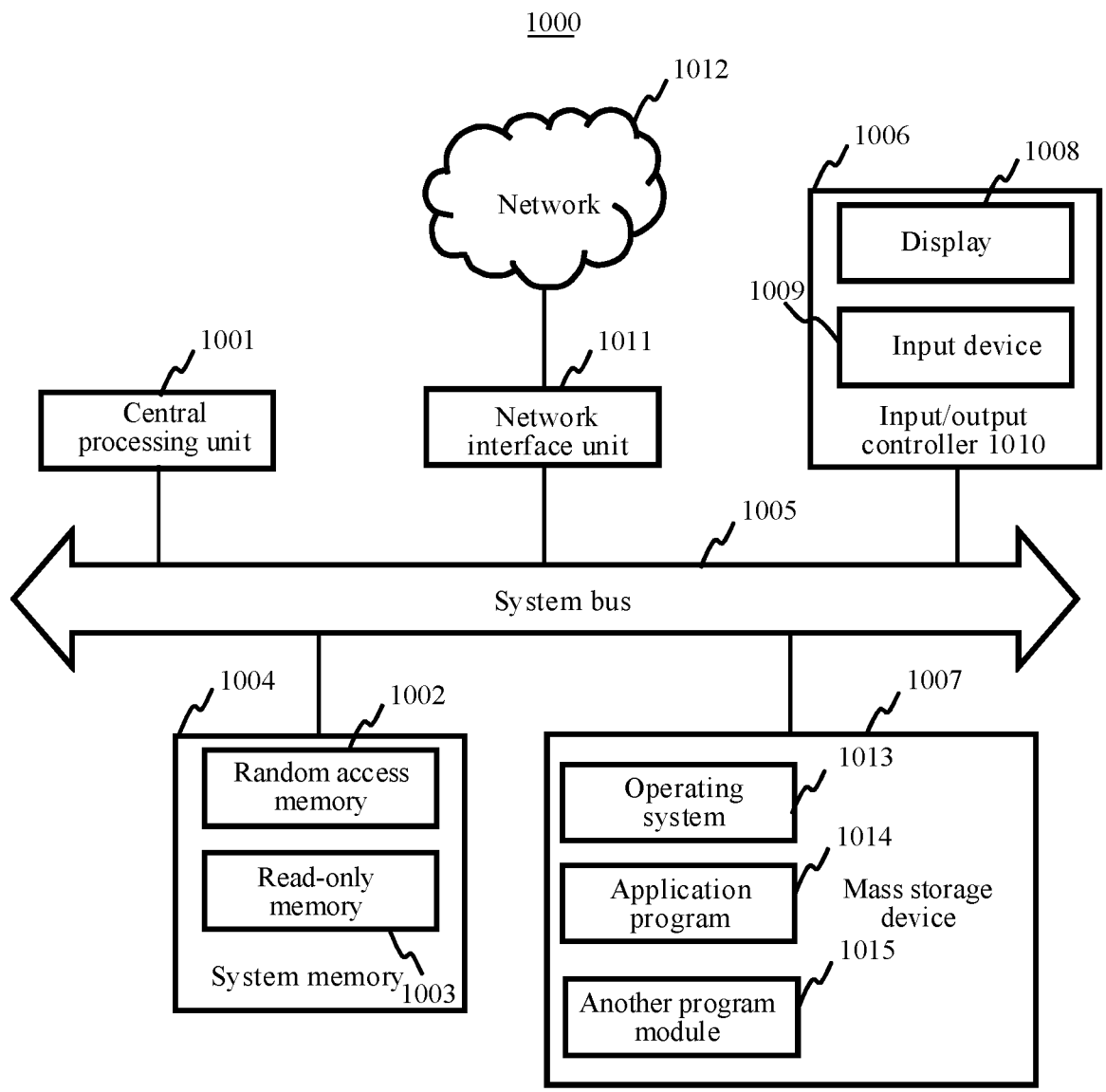
FIG. 10 is a structural block diagram of a server according to an embodiment.

FIG. 10 is a structural block diagram of a server according to an embodiment. The server may be configured to implement the information display method for a virtual pet provided in the foregoing embodiments.

The server 1000 includes a central processing unit (CPU) 1001, a system memory 1004 including a random access memory (RAM) 1002 and a read-only memory (ROM) 1003, and a system bus 1005 connecting the system memory 1004 to the CPU 1001. The server 1000 further includes a basic input/output system (I/O system) 1006 assisting in transmitting information between devices in a computer, and a mass storage device 1007 configured to store an operating system 1013, an application program 1014 and another program module 1015.

The basic I/O system 1006 includes a display 1008 configured to display information and an input device 1009, such as a mouse or a keyboard, configured to input information for a user. The display 1008 and the input device 1009 are both connected to the CPU 1001 by using an input/output controller 1010 connected to the system bus 1005. The basic I/O system 1006 may further include the input/output controller 1010 to be configured to receive and process inputs from a plurality of other devices such as a keyboard, a mouse, and an electronic stylus. Similarly, the input/output controller 1010 further provides an output to a display screen, a printer, or another type of output device.

The mass storage device 1007 is connected to the central processing unit 1001 by using a mass storage controller that is connected to the system bus 1005. The mass storage device 1007 and its associated computer-readable medium provide non-volatile storage for the server 1000. That is, the mass storage device 1007 may include the computer-readable medium, such as a hard disk or a CD-ROM driver.

Furthermore, the computer-readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an EPROM, an EEPROM, a flash memory, or other solid storage technologies; a CD-ROM, a DVD, or other optical storages; and a cassette, a magnetic tape, a disk storage, or other magnetic storage devices. Certainly, persons skilled in art can know that the computer storage medium is not limited to the foregoing several types. The system memory 1004 and the mass storage device 1007 may be collectively referred to as a memory.

According to various embodiments of the disclosure, the server 1000 may be further connected, by using a network such as the Internet, to a remote computer on the network and run. That is, the server 1000 may be connected to a network 1012 by using a network interface unit 1011 connected to the system bus 1005, or may be connected to another type of network or remote computer system by using the network interface unit 1011.

The memory further includes one or more computer-readable instructions. The one or more computer-readable instructions are stored in the memory and configured to be executed by one or more processors. The one or more computer-readable instructions include an instruction used for performing the foregoing information display method for a virtual pet.

In an embodiment, a computer device is further provided, including a processor and a memory, the memory storing at least one computer-readable instruction, at least one program code or an instruction set. The at least one computer-readable instruction, the at least one program code or the instruction set may be configured to be executed by one or more processors, to implement the foregoing information display method for a virtual pet.

The computer device may be a terminal or a server.

In an embodiment, a computer-readable storage medium is further provided, the storage medium storing at least one computer-readable instruction, at least one program, code or an instruction set, and the at least one computer-readable instruction, the at least one program, code or the instruction set, when being executed by the processor of the computer device, implementing the foregoing information display method for a virtual pet.

The computer-readable storage medium may be a ROM, a RAM, a CD-ROM, a magnetic tape, a floppy disk, an optical data storage device, or the like.

In an embodiment, a computer program product is provided. When the computer program product is executed, the computer program product is configured to implement the foregoing information display method for a virtual pet.

It is to be understood that "plurality of" mentioned in the disclosure means two or more. The "and/or" describes an association relationship for describing associated objects and represents that three relationships may exist. For example, A and/or B may represent the following cases: only A, both A and B, and only B. The character "/" generally indicates an "or" relationship between the associated objects.

The foregoing descriptions are merely example embodiments of the disclosure, and are not intended to limit the scope of the disclosure. Any modification, equivalent replacement, or improvement may be made within the spirit and principle of the disclosure and shall fall within the protection scope of this disclosure.

What is claimed is:

1. An information display method for providing at least one image of a virtual pet, performed by a terminal, the method comprising:
    obtaining, by the terminal, an event display instruction corresponding to the virtual pet from a user;
    obtaining, by the terminal from a server, event journal information of the virtual pet according to the event display instruction, the event journal information comprising information about n events related to the virtual pet, where n is a positive integer; and
    displaying the event journal information of the virtual pet using a first application program on a display of the terminal,
    wherein the obtaining the event journal information of the virtual pet according to the event display instruction further comprises:
        generating, according to the event display instruction, an event obtaining request including identification information of the virtual pet;
        transmitting the event obtaining request to the server for triggering the server to obtain the event journal information and pet information including a unique gene sequence of the virtual pet, from a blockchain system; and
        receiving the event journal information and the pet information of the virtual pet from the server,
    wherein an image of the virtual pet is generated according to a genetic inheritance rule based on the unique gene sequence of the virtual pet stored in the blockchain system, and
    wherein the gene sequence of the virtual pet stored in the blockchain system is capable of being migrated into a second application program that is different from the first application program.

2. The information display method according to claim 1, wherein the displaying the event journal information further comprises:
    obtaining, for an $i^{th}$ event among the n events, an event type of the $i^{th}$ event, where i is a positive integer less than or equal to n;
    displaying an event template corresponding to the event type of the $i^{th}$ event on an event display interface; and
    filling the event template with information about the $i^{th}$ event to obtain display content of the $i^{th}$ event.

3. The information display method according to claim 2, wherein the display content of the $i^{th}$ event comprises identification information of a user account related to the $i^{th}$ event, and
    wherein, after the filling the event template with the information about the $i^{th}$ event to obtain the display content of the $i^{th}$ event, the method further comprises:
        obtaining an operation signal corresponding to the identification information of the user account; and
        displaying a detail interface of the user account according to the operation signal.

4. The information display method according to claim 2, wherein the display content of the $i^{th}$ event comprises identification information of the virtual pet related to the $i^{th}$ event, and
    wherein, after the filling the event template with the information about the $i^{th}$ event to obtain the display content of the $i^{th}$ event, the method further comprises:
        obtaining an operation signal corresponding to the identification information of the virtual pet; and
        displaying a detail interface of the virtual pet according to the operation signal.

5. The information display method according to claim 2, wherein the event type comprises at least one of a bait purchase event, a capture event, a summon event, a birth event, a mating event, a breeding event, or a trading event.

6. The information display method according to claim 1, wherein the information about the n events is sorted according to occurrence time points of the n events.

7. An information display apparatus for providing at least one image of a virtual pet, comprising:
    at least one memory storing computer program code; and
    at least one processor configured to access the at least one memory and operate as instructed by the computer program code, the computer program code comprising:
    instruction obtaining code configured to cause the at least one processor to obtain an event display instruction corresponding to the virtual pet from a user;
    information obtaining code configured to cause the at least one processor to obtain, from a server, event journal information of the virtual pet according to the event display instruction, the event journal information comprising information about n events related to the target virtual pet, where n is a positive integer; and
    information display code configured to cause the at least one processor to display the event journal information of the virtual pet using a first application program on a display of the information display apparatus,
    wherein the information obtaining code is further configured to cause the at least one processor to:
        generate, according to the event display instruction, an event obtaining request including identification information of the virtual pet;
        transmit the event obtaining request to the server for triggering the server to obtain the event journal information and pet information including a unique gene sequence of the virtual pet, from a blockchain system; and
        receive the event journal information and the pet information of the virtual pet from the server,
    wherein an image of the virtual pet is generated according to a genetic inheritance rule based on the unique gene sequence of the virtual pet stored in the blockchain system, and
    wherein the gene sequence of the virtual pet stored in the blockchain system is capable of being migrated into a second application program that is different from the first application program.

8. The information display apparatus according to claim 7, wherein the information display code is further configured to cause the at least one processor to:
    obtain, for an $i^{th}$ event among the n events, an event type of the $i^{th}$ event, where i is a positive integer less than or equal to n;
    display an event template corresponding to the event type of the $i^{th}$ event on an event display interface; and
    fill the event template with information about the $i^{th}$ event to obtain display content of the $i^{th}$ event.

9. The information display apparatus according to claim 8, wherein the display content of the $i^{th}$ event comprises identification information of a user account related to the $i^{th}$ event, and
    wherein, after the filling the event template with the information about the $i^{th}$ event to obtain the display content of the $i^{th}$ event, the information display code is further configured to cause the at least one processor to:
        obtain an operation signal corresponding to the identification information of the user account; and
        display a detail interface of the user account according to the operation signal.

10. The information display apparatus according to claim 8, wherein the display content of the $i^{th}$ event comprises identification information of a user account related to the $i^{th}$ event, and
    wherein, after the filling the event template with the information about the $i^{th}$ event to obtain the display content of the $i^{th}$ event, the information display code is further configured to cause the at least one processor to:
        obtain an operation signal corresponding to the identification information of the virtual pet; and
        display a detail interface of the virtual pet according to the operation signal.

11. The information display apparatus according to claim 8, wherein the event type comprises at least one of a bait purchase event, a capture event, a summon event, a birth event, a mating event, a breeding event, or a trading event.

12. The information display apparatus according to claim 7, wherein the information about the n events is sorted according to occurrence time points of the n events.

13. A non-transitory computer-readable storage medium storing computer program code to cause at least one computer processor to:
    obtain an event display instruction corresponding to a virtual pet from a user;
    obtain, from a server, event journal information of the virtual pet according to the event display instruction, the event journal information comprising information about n events related to the target virtual pet, where n is a positive integer; and
    display the event journal information of the virtual pet using a first application program,
    wherein the computer program code is further configured to cause the at least one processor to:
        generate, according to the event display instruction, an event obtaining request including identification information of the virtual pet;
        transmit the event obtaining request to the server for triggering the server to obtain the event journal information and pet information including a unique gene sequence of the virtual pet, from a blockchain system; and receive the event journal information and the pet information of the virtual pet from the server, wherein an image of the virtual pet is generated according to a genetic inheritance rule based on the unique gene sequence of the virtual pet stored in the blockchain system, and wherein the gene sequence of the virtual pet stored in the blockchain system is capable of being migrated into a second application program that is different from the first application program.

14. The non-transitory computer-readable storage medium according to claim 13, wherein the computer program code is configured to cause the at least one computer processor to:

obtain, for an $i^{th}$ event among the n events, an event type of the $i^{th}$ event, where i is a positive integer less than or equal to n;

display an event template corresponding to the event type of the $i^{th}$ event on an event display interface; and fill the event template with information about the $i^{th}$ event to obtain display content of the $i^{th}$ event.

15. The non-transitory computer-readable storage medium according to claim 14, wherein the event type comprises at least one of a bait purchase event, a capture event, a summon event, a birth event, a mating event, a breeding event, or a trading event.

* * * * *